March 31, 1959 S. C. KOMROSKY 2,879,800
POPPET CONTROLLED GATE VALVE
Filed April 3, 1956 2 Sheets-Sheet 1
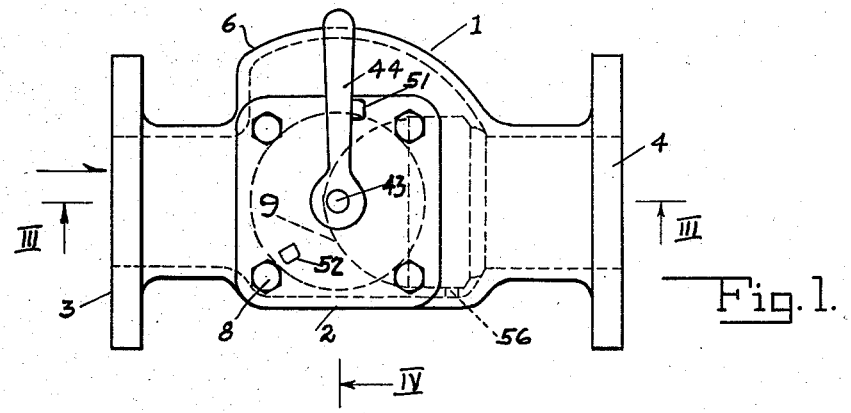
Fig. 1.
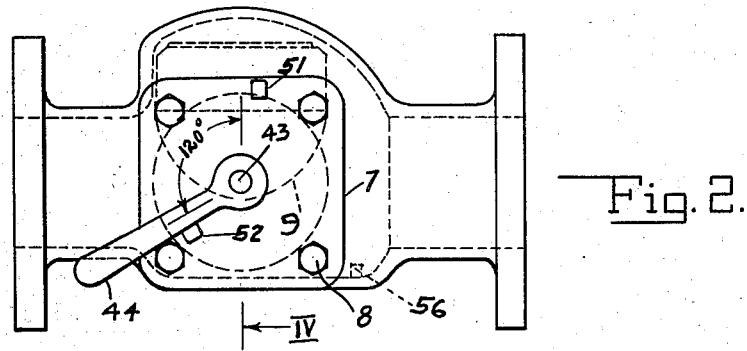
Fig. 2.
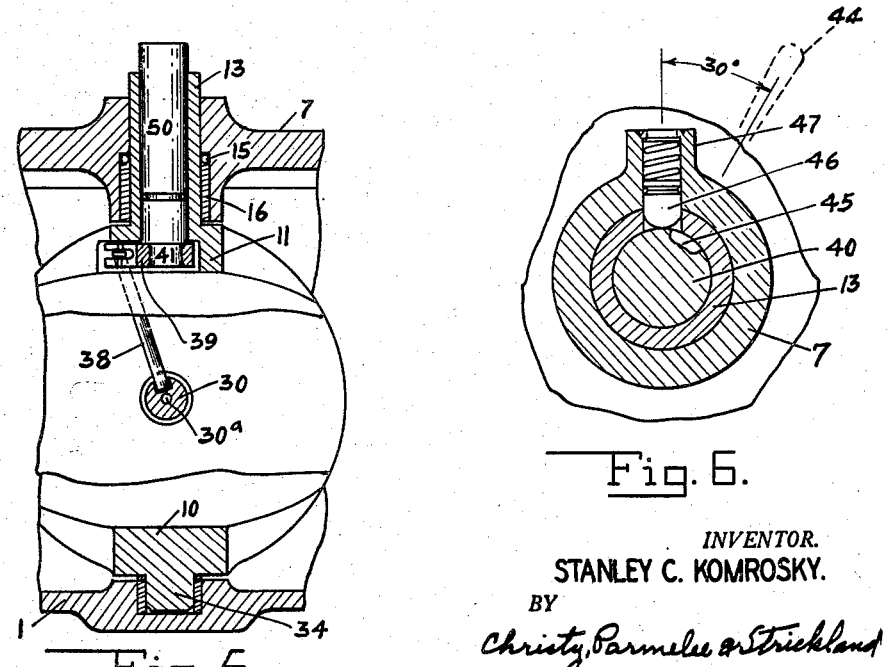
Fig. 6.
Fig. 5.
INVENTOR.
STANLEY C. KOMROSKY.
BY
Christy, Parmelee & Strickland
ATTORNEYS.

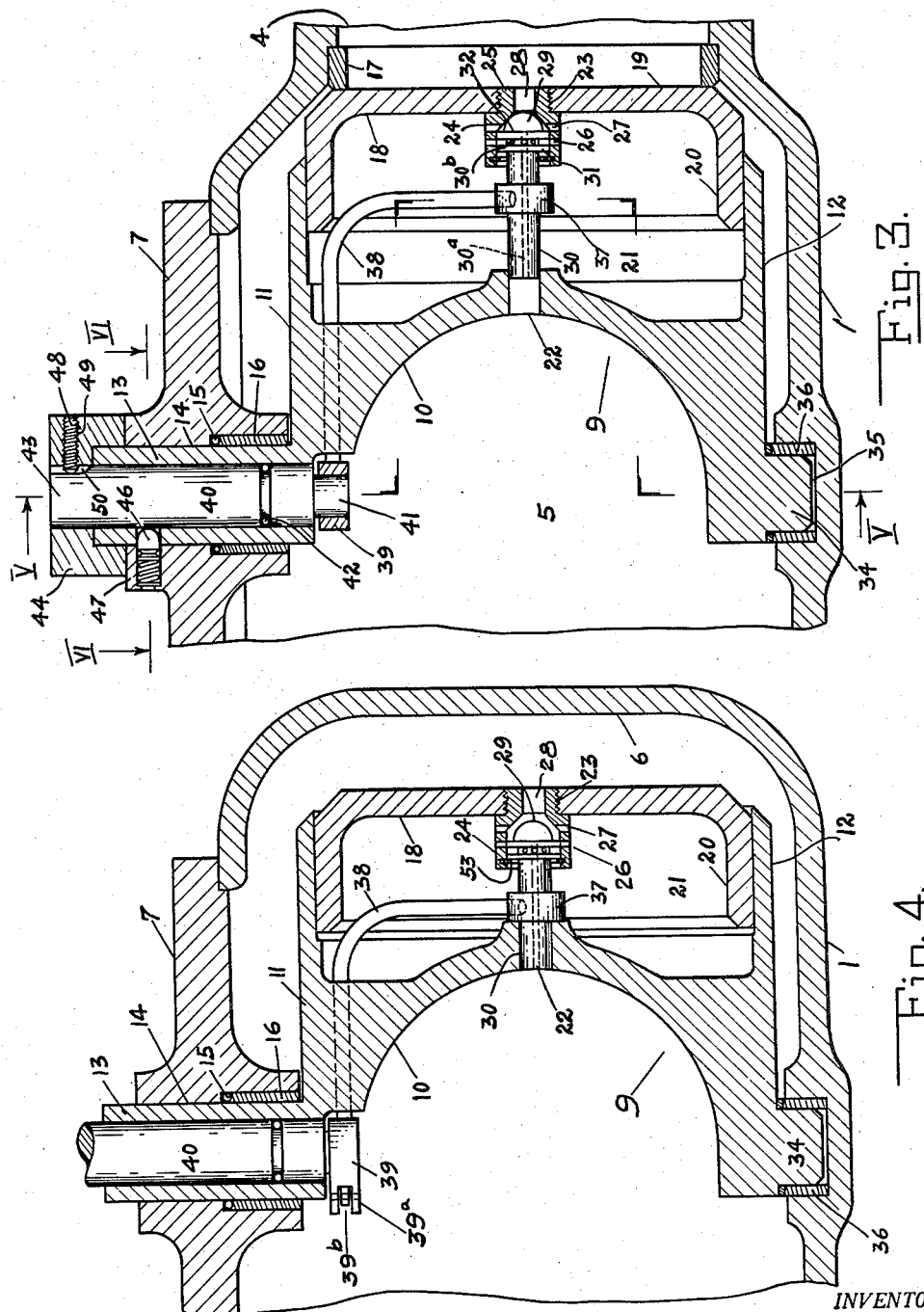

United States Patent Office 2,879,800
Patented Mar. 31, 1959

2,879,800

POPPET CONTROLLED GATE VALVE

Stanley C. Komrosky, Glenshaw, Pa.

Application April 3, 1956, Serial No. 575,855

7 Claims. (Cl. 137—630.15)

The present invention is concerned generally with valves for the control of fluid pressures of large magnitudes. More specifically the invention is concerned with a valve having a pressure actuated sealing member controlling flow of fluid pressure through the valve and provided with means for readily equalizing pressure on opposite sides of said sealing member prior to rotation to a position permitting unimpeded flow of fluid pressure through the valve.

The valve of the invention is a modified type of gate valve wherein the sealing member is housed within the gate portion of the valve and is extensible therefrom to seal off flow of fluid pressure and retractable within the housing after balancing of the pressures on opposite sides of the sealing member by means of a poppet type control means.

One object of the invention is to provide a valve of the character described for control of a wide range of pressures with the same speed and ease of operation of the valve.

Another object of the invention is to provide a valve of the character described which may be constructed of interchangeable parts which do not require grinding or machining to accurate tolerances.

A further object of the invention is to provide a gate type valve which in open position has the gate disposed to one side of the housing providing a fluid pressure passageway in the housing of the same or greater cross sectional area than the pressure lines leading to and away from the valve.

These and other objects will appear from the following description wherein the drawings forming a part thereof comprise:

Fig. 1 showing a plan view of the valve in closed position;

Fig. 2 showing a plan view of the valve in fully open position;

Fig. 3 showing a section through the valve in closed position taken on lines III—III of Fig. 1;

Fig. 4 showing a section through the valve in fully open position taken along lines IV—IV of Fig. 2;

Fig. 5 showing a section through the valve on lines V—V of Fig. 3; and

Fig. 6 showing a section through the valve operating stem along lines VI—VI of Fig. 3.

Referring now in detail to the drawings, reference character 1 indicates the valve generally comprising a housing 2 provided with inlet port 3 and outlet port 4. The housing 2 provides a hollow enclosure 5 within which the valve gate is pivotally mounted and an extension 6 within which the gate is disposed when rotated to open position of the valve. The enclosure 5 has an opening extending through one wall of housing 2 which is closed by a suitable removable cover 7 held in place by bolts 8.

The valve gate, indicated generally by reference character 9, comprises a substantially semi-spherical concave wall portion 10 terminating in a rearwardly extending hollow portion disposed in spaced relation to the walls of enclosure 5 and having an open end. The hollow portion is preferably cylindrical but may be rectangular. As shown in cross section on Figs. 3 and 4, the top wall portion 11 of the enclosure terminates forwardly of the intermediate portion of wall portion 10 in an upstanding sleeve portion 13 extending through opening 14 of valve cover 7. The inner face of opening 14 of valve cover 7 is counter-bored to receive the O-ring 15 and bearing 16. Outlet port 4 of the valve housing at its inner end is counter-bored to receive a removable seating member 17. Slidably mounted within the rearwardly extending hollow portion of valve gate 9 is a sealing member 18 corresponding in contour to said hollow portion and provided with an end web 19 and side walls 20 extending towards gate wall portion 10. The sealing member 18 is reciprocally mounted in said enclosure and when in fully extended position its wall portion 19 is engageable with the valve seat 17. With the sealing member 18 engaged with the valve seat 17 a chamber 21 is formed between the wall portion 19 of the sealing member and web 10 of the gate. Said wall portions 10 and 19 have aligned openings 22 and 23 respectively therein. Mounted on the inner face of wall portion 19 is a poppet valve body 24 having a reduced end portion 25 seating in opening 23 of wall portion 19. Poppet valve body 24 is hollow and open ended. The walls of valve body 24 are provided with spaced circumferential openings 26 and 27. The opening 28 in portion 25 of the poppet valve body connects the interior thereof with outlet port 4. Mounted within the valve body 24 is a poppet valve comprising a head portion 29, stem portion 30 and spaced rings 31 and 32 on the stem portion adjacent said head portion. The head portion 29 and rings 31 and 32 are disposed within the body 24 and retained therein by means of the snap ring 53. The poppet valve head portion 29 serves to selectively seal opening 28 of valve body 24. The free end of poppet valve stem 30 is seated in opening 23 of gate wall portion 10 for reciprocal movement therein. An opening 30a extends axially through stem 30 from the free end thereof to adjacent head portion 29. Circumferentially spaced openings 30b between rings 31 and 32 connect the periphery of stem 30 with the opening 30a therein.

At the lower edge of gate 9 and integral with the forward extension of bottom wall portion 12 is a trunnion 34 bearing in a suitable opening 35 formed in the adjacent valve body 2. A suitable bearing 36 within opening 35 reduces friction between the trunnion and the valve body 2. In axial alignment with the trunnion 34 and upstanding sleeve 13 of the gate 9 and within the sleeve 13 is a gate operating shaft 40. Shaft 40 has an end portion 41 depending below sleeve 13. Rigidly mounted on end 41 of shaft 40 is a rocker sleeve 39. Rigidly mounted on poppet valve stem 30 is a sleeve 37. Connecting the sleeves 37 and 39 is a substantially L-shaped rocker arm 38. One end of rocker arm 38 is engaged with the adjacent sleeve 37 and the opposite end of the arm 38 is connected with an eccentric arm 39a of sleeve 39 by means of a suitable pin disposed between the arms of the slotted opening 39b of arm 39a. Above sleeve 39 and recessed into shaft 40 is an O-ring 42 sealing off pressure within the valve. Shaft 40 has a portion 43 extending above sleeve 13 and a handle 42 is mounted on such extension.

Shaft 40 has a detent recess 45 spaced about 30° from the center line of handle 44 when gate 9 is in fully closed position. A spring loaded detent 46 is mounted in boss 47 of cover 7 and sleeve 13 for selectively connecting rocker arms 40 with gate sleeve portion 13. Handle 44 is rigidly connected upon extension 43 of shaft 40 by a suitable set screw 48 extending through the threaded opening 49 and offset 50 in shaft extension 43. Rotation of handle 44 may be limited by suitable stops 53 and 54 when in closed and opened positions respectively.

Referring now to Figs. 1, 3 and 6 of the drawings, handle 44 of Fig. 6 is shown by dotted lines in its relation with the detent 46 and sealing member 18 is shown in sealing position on valve seat 17 preventing flow of the fluid pressure through the valve. The poppet valve head 29 of Fig. 4 is positioned to seal opening 28 in the member 18 so that fluid pressure entering the valve in engagement with web 10 of the gate flows through openings 30a and 30b of stem 30 into the member 24 and through port 26 in said latter member into the chamber 21. In this manner pressure within the chamber 21 is substantially that upon the front face of gate web 10. As will be observed from Fig. 3 the cross sectional area of the chamber 21 is greater than the cross sectional area of the valve seat 17 in outlet port 4 so that the sealing member 18 is retained in sealing position by reason of the pressure differential on opposite faces of its wall portion 19. It will also be observed from Fig. 3 that, except for its pivotal mounting, the only contact between the gate assembly indicated generally by the reference character 9 and the valve housing is through members 17 and 18. Any attempt to rotate valve 9 under the above recited condition would be resisted by the frictional contact of member 18 with the valve seat member 17.

Referring now to Figs. 2, 3, 4 and 6 of the drawings, it will be noted from Fig. 6 that handle 44, when rotated in a counterclockwise direction from the position shown in dotted lines on Fig. 6, has its first 30° of movement independently of portion 13 of gate 9, or in other words rotates only the shaft 40 and rocker arm 38. As handle 44 moves through the first 30°, shaft 40 rotating concurrently therewith acts through the member 38 to advance the member 37 and stem 30 of the poppet valve towards wall portion 10 of the gate 9. When the poppet stem 30 so moves, it first retracts poppet head 29 from the opening 28 in member 18 and connects such opening through port 27 of the poppet valve body 24 with the interior of chamber 21. During this described movement the ring 32 on the poppet valve stem 30 advances to close port 26 in poppet valve portion 24 cutting off flow of fluid pressure through the member 30 to chamber 21, and valve ring 31 engages the snap ring 52 preventing further relative movement between the poppet valve stem portion 30 and the poppet valve body portion 24. At the end of such described movement the sealing member wall portion 19 is still seated on the valve seat member 17 but the pressure within chamber 21 and at the outlet port 4 on opposite sides of the sealing member 18 has equalized. During the remainder of the first 30° movement of the handle 44, the rocker arm 38 further retracts the poppet valve stem portion 30 and the sealing member 18 from the position shown in Fig. 3 of the drawings to that shown in Fig. 4. The sealing member 18 now being free of the valve seat 17, fluid pressure now begins to flow from inlet 3 through the outlet 4 of valve 1. At the end of this 30° movement of the handle the detent 46 engages with the recess 45 and causes concurrent movement of shaft 40 and valve gate sleeve portion 13 in engagement therewith. Further counterclockwise movement of handle 44, then rotates gate 9 from the position indicated by dotted lines of Fig. 1 to that indicated by the dotted lines of Fig. 2. When gate 9 is positioned as shown in Fig. 2, it is likewise disposed in the offset portion 6 of the housing 2 as shown in detail on Fig. 4 of the drawings. When the gate is so positioned there is an unimpeded flow of fluid pressure from inlet port 3 through the valve housing and out of the valve through outlet port 4.

To close the valve, the handle 44 is rotated 120° in a clockwise direction from the position shown in Fig. 2 into that shown in Fig. 1 of the drawings. During the first 90° of rotation of the handle 44 in a closing direction the gate 9 and sealing member 18 are rotated concurrently until the gate 9 engages the stop 56 preventing further rotation of the gate and causing the detent 46 to be retracted from the recess 45 in the shaft 40. Further rotation of shaft 40, independently of sleeve 13, causes eccentric 39 to move rocker arm 48 rearwardly of valve web 10 from the position shown in Fig. 4 of the drawings to that shown in Fig. 3 of the drawings. Initial movement of the rocker arm in retracting poppet valve stem portion 30 from gate wall portion 10, first engages poppet valve head 29 with the opening 28, closing off port 27 and opening port 26, thus connecting the chamber 21 with fluid pressure on the concave face of gate wall portion 10. Further movement of rocker arm 38, in retracting stem 30, advances the sealing member 18 into sealing position upon the valve member 17 as shown in Fig. 3 of the drawings. The valve is now in closed position and fluid pressure built up in the chamber 21 retains the sealing member in this position by reason of the pressure differential on opposite sides of the wall portion 19 of the member 18.

The balanced quick opening features of the valve and the unrestricted flow of fluid pressure through the valve will be readily understood from the foregoing description of the presently preferred form of construction thereof. The gate 9 with its rearwardly extending enclosure housing sealing member 18, when in closed position has its entire surface engaged by the fluid under pressure entering the valve. The sealing member 18 is held in sealing position by mechanical movement of rocker arm 38 and pressure differential on opposite faces of the wall portion 19 of the sealing member. A minimum effort is required to actuate poppet valve head 29 to equalize pressure on opposite faces of the sealing member and to initiate flow of the fluid pressure through the valve. Due to equalization of pressure on opposite faces of sealing member wall portion 19 the member may be readily fully retracted within gate 9 for concurrent rotation therewith. The radius of concavity of gate wall portion 10 may be regulated to provide, when in open position, an area between such wall portion and the opposite side of the valve housing which is equal to or even greater than the area of either of ports 3 and 4 eliminating any restriction of flow through the valve such as is encountered in the conventional gate valve construction. The cost of construction and maintenance of such valve is much less than in conventional gate valve construction. The several parts of the valve are replaceable and may be constructed with liberal machining tolerances. The valve requires proportionately little mechanical effort to open and close regardless of the magnitude of fluid pressure being controlled. The term "fluid pressure" as used herein designates either a liquid or air.

Many obvious changes in the details of construction of the valve will suggest themselves to those skilled in the art and may be made without departing from the invention disclosed. For these reasons the exact details of construction shown are to be considered as being for purposes of illustration and not limitation except as made necessary by the scope of the appended claims.

I claim:

1. In a fluid pressure control valve in combination, a housing, an inlet to the housing, an outlet from the housing, a gate member pivotally mounted within the housing in spaced relation thereto for selective disposition across the line of flow of fluid pressure through the housing and wholly to one side thereof, an outlet sealing member mounted on the gate for alternate reciprocal movement relative thereto into and out of engagement with the housing outlet and for concurrent rotation with said gate, said sealing member in sealing position being held therein by fluid pressure from the housing inlet, means for imparting reciprocal movement to said sealing member and selective application of fluid pressure thereto from the housing inlet, an opening in said sealing member communicating with the outlet port when in sealing position, and a poppet valve in said means for cutting off fluid pressure from the inlet to said sealing member and for uncovering said opening to equalize fluid pressure on opposite sides of the sealing member prior to reciprocal movement of the sealing member out of sealing position.

2. In a fluid pressure control valve, in combination, a housing having spaced inlet and outlet ports, a gate member eccentrically mounted for pivotal movement within the housing in spaced relation thereto and alignment with the outlet portion when in sealing position, said gate member having a concave wall portion facing the inlet port and a hollow open ended enclosure extending rearwardly therefrom toward the outlet portion, a sealing member slidably mounted within said enclosure and provided with a wall portion closing said enclosure end opening, a seat for said sealing member wall portion on the inner face of the valve housing outlet port, aligned openings in said gate and sealing member wall portions, means seated in said wall portion opening and conecting said wall portions for effecting reciprocal movement of the sealing member within said gate enclosure, said means having limited movement relative to the sealing member and gate providing for selective admission of fluid pressure from the outlet and inlet port respectively into the space between said wall portion to establish balance and unbalanced fluid pressures on opposite sides of said sealing member wall portion, a shaft mounted in said gate for limited rotation relative thereto, an operating handle disposed exteriorly of the housing for rotating of said gate shaft, and an operating member connected with said gate shaft and with said means for providing reciprocal movement of the said means relative to the sealing member and the said means and sealing member relative to the gate.

3. In a fluid pressure control valve, in combination, a housing having aligned inlet and outlet openings, a gate pivotally mounted in the housing and having an eccentrically disposed wall portion for selective disposition across the line of flow through said openings and wholly to one side of said line of flow, an open ended housing on one side of said wall portion, an outlet opening sealing member reciprocally mounted in said wall portion housing and forming therewith an extensible fluid pressure chamber, means slidably mounted in said gate wall portion and sealing member for controlling flow of inlet fluid under pressure into and out of said chamber, a handle mounted exteriorly of said valve housing and operatively connected with said gate for imparting pivotal movement thereto, and a member operatively connected with the handle and with said means for advancing and retracting said sealing member into and out of sealing engagement with the outlet opening independently of movement in said gate.

4. The fluid pressure control valve as defined in claim 3 wherein the gate wall portion when disposed across said line of flow through said valve is in spaced relation to the inner walls of the casing and the sealing member when extended has an area under pressure from fluid pressure within the valve housing greater than the area under pressure from back pressure at the outlet port.

5. The fluid pressure control valve as defined in claim 3 wherein said means includes a poppet valve controlled by said handle.

6. In a fluid pressure control valve, in combination, a housing having inlet and outlet openings for fluid pressure flowing through the valve, a gate mounted for pivotal movement within the housing in spaced relation to the housing walls, said gate having a closed wall portion disposed transversely to the line of flow of fluid through the valve in closed position and an open ended enclosure extending outwardly from the opposite face thereof, a valve outlet sealing member having a rear wall and forwardly extending side wall disposed in said gate enclosure forming therewith an extensible pressure chamber, aligned openings in said gate and sealing member wall portions, a poppet valve means mounted in said openings, said poppet valve means acting to admit pressure from the valve inlet to the extensible chamber in providing a pressure differential upon the sealing member wall maintaining the sealing member in outlet closing position when the valve is closed and to equalize pressure on opposite faces of the sealing member wall prior to rotating the valve gate to open position.

7. In a valve for control of fluid pressure flowing therethrough, in combination, a housing, fluid inlet and outlet openings in said housing, a gate mounted in said housing in spaced relation to the walls of the housing and to said openings, a wall portion on said gate having a front face disposed transversely of the line of flow of fluid through said openings when the valve is closed, a hollow enclosure extending outwardly from the rear face of the gate wall portion and provided with an open end disposed in alignment with said outlet openings when the valve is closed, an outlet opening sealing member having a wall portion of a cross-sectional area larger than that of the outlet opening and mounted in the gate enclosure for movement into and out of sealing engagement with said outlet opening, aligned openings in said gate and sealing member wall portions, a poppet valve housing mounted on the inner face of said sealing member wall portion in alignment with the openings therein, a poppet valve stem having one end disposed in said gate wall portion opening, a head portion on the opposite end of said stem and disposed in said poppet valve housing for reciprocal movement into and out of engagement with the sealing member wall portion opening, a detachable member on said poppet valve housing retaining said head portion therein, and opening in said poppet valve stem extending axially thereof from the end thereof in said gate wall portion opening to adjacent said head, an opening in said valve stem connecting the periphery thereof with the axial openings therein rearwardly of said head and within said poppet valve housing, a pair of ring members spaced axially of the stem within said housing and secured thereto on opposite sides of said valve stem peripheral valve opening, ports in said poppet valve housing alternately connecting the exterior of said poppet valve housing with the axial opening of the valve stem and the opening in said sealing member wall portion as the valve stem head moves into and out of sealing engagement with said wall portion opening, an operating member connected with said gate for rotation thereof and extending exteriorly of the control valve housing, a member connecting the gate operating member and poppet valve stem for imparting reciprocal movement to the sealing member independently of rotation of the valve gate.

References Cited in the file of this patent

UNITED STATES PATENTS

| | | |
|---|---|---|
| 245,731 | Linke | Aug. 16, 1881 |
| 681,172 | Koenig | Aug. 20, 1901 |
| 1,527,482 | Huguenin | Feb. 24, 1925 |